US 8,722,842 B2

(12) United States Patent
Iida et al.

(10) Patent No.: US 8,722,842 B2
(45) Date of Patent: *May 13, 2014

(54) OPTICAL FILM AND IMAGE DISPLAY DEVICE

(75) Inventors: Toshiyuki Iida, Ibaraki (JP); Yutaka Ohmori, Ibaraki (JP); Miyuki Kurogi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 440 days.

This patent is subject to a terminal disclaimer.

(21) Appl. No.: 12/595,133

(22) PCT Filed: Apr. 3, 2008

(86) PCT No.: PCT/JP2008/056665
§ 371 (c)(1),
(2), (4) Date: Oct. 8, 2009

(87) PCT Pub. No.: WO2008/132951
PCT Pub. Date: Nov. 6, 2008

(65) Prior Publication Data
US 2010/0110554 A1    May 6, 2010

(30) Foreign Application Priority Data

Apr. 17, 2007 (JP) .................................. 2007-107991

(51) Int. Cl.
*C08G 73/00* (2006.01)
(52) U.S. Cl.
USPC ........... 528/170; 385/142; 385/145; 428/220; 528/125; 528/128; 528/172; 528/324; 570/126; 570/128
(58) Field of Classification Search
USPC ......... 528/353, 125, 128, 170, 172–174, 176, 528/185, 188; 428/220; 570/126, 128; 385/142, 145
See application file for complete search history.

(56) References Cited

U.S. PATENT DOCUMENTS

| | | | |
|---|---|---|---|
| 5,598,501 A | 1/1997 | Maruo et al. | |
| 5,750,641 A | 5/1998 | Ezzell et al. | |
| 5,969,088 A | 10/1999 | Ezzell et al. | |
| 6,074,709 A | 6/2000 | Ezzell et al. | |
| 8,218,937 B2 * | 7/2012 | Iida et al. ..................... | 385/142 |

FOREIGN PATENT DOCUMENTS

| | | | |
|---|---|---|---|
| JP | 2000-511296 A | 8/2000 | |
| JP | 2002-221622 A | 8/2002 | |
| JP | 2005-15442 A | 1/2005 | |
| JP | 2005-015442 A | 1/2005 | |
| JP | 2005-97230 A | 4/2005 | |
| JP | 2006-003715 A | 1/2006 | |
| JP | 2006-3715 A | 1/2006 | |
| JP | 2008-112124 A | 5/2008 | |
| KR | 2000-0015781 A | 3/2000 | |

OTHER PUBLICATIONS

International Search Report for PCT/JP2008/056665, mailing date of Jun. 10, 2008.
Korean Office Action dated May 23, 2011, issued in corresponding Korean Patent Application No. 10-2009-7016232. (w/partial English translation).
Japanese Office Action dated Feb. 10, 2012, issued in corresponding Japanese Patent Application No. 2007-107991.(w/partial English translation).

(Continued)

*Primary Examiner* — Gregory Listvoyb
(74) *Attorney, Agent, or Firm* — Westerman, Hattori, Daniels & Adrian, LLP

(57) ABSTRACT

The present invention provides an optical film exhibiting wavelength dispersion such that a retardation value is smaller on the shorter wavelength side, and capable of being also formed comparatively thinly.

The optical film of the present invention is an optical film including a polyimide-based polymer represented by the following general formula (I).

In the formula (I), m is 40% by mol or more and 100% by mol or less. $R^1$ and $R^2$ each independently denote a substituent having a carbon-carbon double bond or a triple bond. A, A', B, B', E, G, and H each denote a substituent, and small letters corresponding to these alphabets denote substitution number thereof. X and Y each independently denote bond part such as a covalent bond. The substituents having a carbon-carbon double bond or a triple bond represented by $R^1$ and $R^2$ are a substituted or unsubstituted aryl group, a substituted or unsubstituted vinyl group, and a substituted or unsubstituted ethynyl group.

[chemical formula 1]

5 Claims, 1 Drawing Sheet

(56) References Cited

OTHER PUBLICATIONS

Korean Office Action dated Feb. 10, 2012, issued in corresponding Korean Patent Application No. 10-2009-7016232.(w/partial English translation).
Taiwanese Office Action dated Jan. 16, 2012, issued in corresponding Taiwanese Patent Application No. 097112819.(w/partial English translation).
International Search Report of PCT/JP2007/068368 with the mailing date of Dec. 25, 2007.
Chinese Office Action dated Feb. 17, 2011, issued in Chinese Patent Application No. 200780036966.9 with partial English translation.
US Office Action dated Dec. 6, 2011, issued in U.S. Appl. No. 12/433,558.
US Office Action—Restriction Requirement dated Sep. 9, 2011, issued in U.S. Appl. No. 12/433,558.
Unity of Invention dated Sep. 9, 2011, issued in U.S. Appl. No. 12/433,558.

* cited by examiner

OPTICAL FILM AND IMAGE DISPLAY DEVICE

TECHNICAL FIELD

The present invention relates to an optical film exhibiting wavelength dispersion such that a retardation value is smaller on the shorter wavelength side, and to an image display device provided with the optical film.

BACKGROUND ART

A retardation film is an optical film utilized for realizing a wider viewing angle or the like of a liquid crystal display. The retardation value of the retardation film depends on wavelength, and the wavelength dispersion of the retardation value is roughly classified into the following three kinds. The first exhibits wavelength dispersion such that a retardation value is larger on the shorter wavelength side (hereinafter referred to as 'normal dispersion'), the second exhibits wavelength dispersion such that a retardation value scarcely changes ranging from the short wavelength side to the long wavelength side (hereinafter referred to as 'flat dispersion'), and the third exhibits wavelength dispersion such that a retardation value is smaller on the shorter wavelength side (hereinafter referred to as 'reverse dispersion').

Among the three kinds, a retardation film exhibiting reverse dispersion is preferable. The reason therefor is that a retardation film exhibiting reverse dispersion has predetermined retardation (such as λ/2 and λ/4) in a wide wavelength band.

However, generally, many of the retardation films formed from a resin film exhibit normal dispersion.

A retardation film formed from a drawn film of polycarbonate having a fluorene skeleton has been conventionally known (Patent Document 1).

This retardation film develops retardation by a drawing treatment. However, the polycarbonate having a fluorene skeleton has a so high glass transition point that a drawing temperature needs to be determined at an extremely high temperature.

On the other hand, it has been known that a retardation film including polyimide may be formed by coating a solution containing polyimide on a base material and exhibits a predetermined retardation value (Patent Document 2). The formation by coating allows a comparatively thin retardation film to be obtained. However, a retardation film including polyimide generally exhibits normal dispersion (that is, not reverse dispersion).

[Patent Document 1] Japanese Unexamined Patent Publication No. 2002-221622
[Patent Document 2] Japanese Unexamined Patent Publication No. 2000-511296

DISCLOSURE OF THE INVENTION

An object of the present invention is to provide an optical film capable of being also formed comparatively thinly, such that wavelength dispersion exhibits reverse dispersion, and an image display device adopting the optical film.

The present invention provides an optical film including a polyimide-based polymer represented by the following general formula (I).

[chemical formula 1]

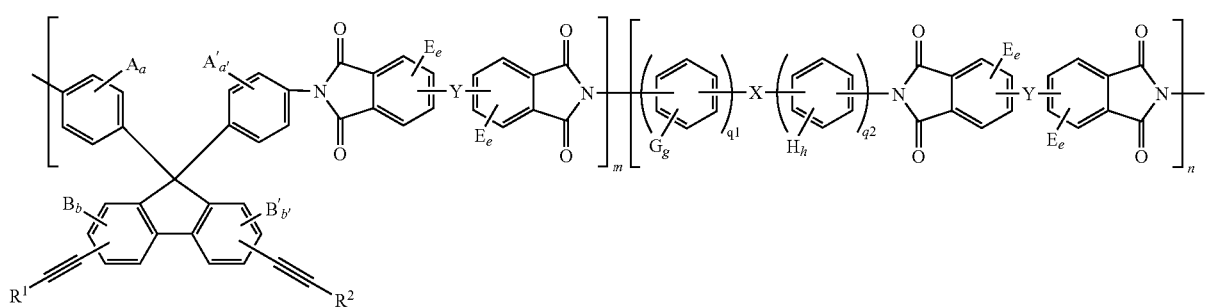

(I)

In the formula (I), m is 40% by mol or more and 100% by mol or less (m+n≤100% by mol). A, A', B and B' each denote a substituent, a and a' denote substitution number of the corresponding A and A' (an integer of 0 to 4), and b and b' denote substitution number of the corresponding B and B' (an integer of 0 to 3). A, A', B and B' each independently denote a halogen or an alkyl group having 1 to 4 carbon atoms, and are each identical or different in the case of being plural. $R^1$ and $R^2$ each independently denote a substituent having a carbon-carbon double bond or a triple bond. X and Y each independently denote a covalent bond, or an atom or a group selected from the group consisting of a $CH_2$ group, a $C(CH_3)_2$ group, a $C(CZ_3)_2$ group (Z is a halogen), a CO group, an O atom, an S atom, an $SO_2$ group, an $Si(CH_2CH_3)_2$ group, and an $N(CH_3)$ group. E is a substituent and e denotes substitution number thereof (an integer of 0 to 3). E denotes an atom or a group selected from the group consisting of a halogen, an alkyl group having 1 to 3 carbon atoms, an alkyl halide group having 1 to 3 carbon atoms, a phenyl group, and a substituted phenyl group, and are each identical or different in the case of being plural. G and H are substituents, g denotes substitution number of G (an integer of 0 to 4), and h denotes substitution number of H (an integer of 0 to 4). G and H each independently denote an atom or a group selected from the group consisting of a halogen, an alkyl group, a substituted alkyl group, a nitro group, a cyano group, a thioalkyl group, an alkoxy group, an aryl group, a substituted aryl group, an alkyl ester group, and a substituted alkyl ester group, and are each identical or different in the case of being plural. Further, q1 denotes an integer of 0 to 3 and q2 denotes an integer of 1 to 3.

With regard to a polyimide-based polymer represented by the formula (I), the conjugated system of a diethynylfluorene skeleton is greatly widened by substituents ($R^1$ and $R^2$) having a carbon-carbon double bond or a triple bond, which are bonded to an ethynyl group thereof. In addition, this polyimide-based polymer contains a repeating unit having a diethynylfluorene skeleton by 40% by mol or more. An optical film including the polyimide-based polymer exhibits reverse dispersion.

The optical film exhibiting reverse dispersion has desired retardation (such as λ/2 and λ/4) in a wide wavelength band, for example. Accordingly, the optical film of the present invention may be appropriately utilized as a retardation film of an image display device for the reason that the form of polarization at each wavelength becomes nearly the same.

In addition, the polyimide-based polymer may be formed into a film by coating in a solution state, so that a comparatively thin optical film can also be formed.

Examples of the substituents having a carbon-carbon double bond or a triple bond, which are represented by $R^1$ and $R^2$, include a substituted or unsubstituted aryl group, a substituted or unsubstituted vinyl group, or a substituted or unsubstituted ethynyl group.

The present invention provides an optical film including a polyimide-based polymer represented by the following general formula (I').

[chemical formula 2]

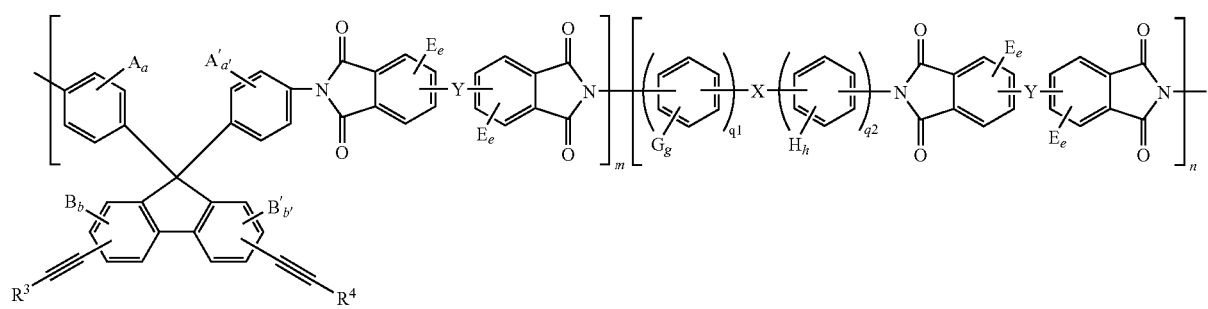

(I')

In the formula (I'), m is 70% by mol or more and 100% by mol or less (m+n≤100% by mol). In the formula (I'), $R^3$ and $R^4$ each independently denote an alkyl group having 1 to 10 carbon atoms or $CR^6R^7(OH)$ ($R^6$ and $R^7$ are each an alkyl group having 1 to 4 carbon atoms). In the formula (I'), Aa, A'a', Bb, B'b', X, Y, Gg, Hh, q1, q2, and Ee are the same as the formula (I).

With regard to the polyimide-based polymer represented by the formula (I'), $R^3$ and $R^4$ bonded to an ethynyl group of a diethynylfluorene skeleton are not conjugated substituents. Thus, the extent of the conjugated system in a side chain is small as compared with the polyimide-based polymer of the formula (I). However, the polyimide-based polymer represented by the formula (I') contains a repeating unit having a diethynylfluorene skeleton in a comparatively large amount (m is 70% by mol or more). Thus, an optical film including the polyimide-based polymer represented by the formula (I') exhibits reverse dispersion.

This polyimide-based polymer represented by the formula (I') can be similarly formed into a film by coating in a solution state, so that a comparatively thin optical film can be also formed.

The preferable optical film of the present invention satisfies a relationship of Rth(450)/Rth(550)≤0.98.

The preferable optical film of the present invention satisfies a relationship of Rth(650)/Rth(550)≥1.02.

The preferable optical film of the present invention is composed of a coating film obtained by coating the polyimide-based polymer on a base material.

The thickness of the optical film of the present invention is preferably 20 μm or less.

An index ellipsoid of the preferable optical film of the present invention satisfies a relationship of nx≈ny>nz.

An index ellipsoid of the preferable optical film of the present invention satisfies a relationship of nx>ny>nz.

In addition, the present invention provides an image display device having the optical film and preferably a liquid crystal display having the optical film.

The image display device having the optical film of the present invention is excellent in viewing angle characteristics, thin, and light.

BEST MODE FOR CARRYING OUT THE INVENTION

Figure 1:
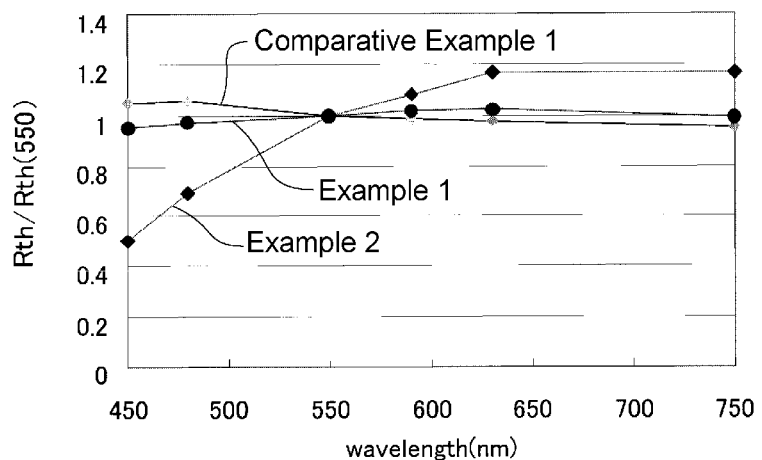
FIG. 1 is a graph showing wavelength dispersion of Examples 1 and 2 and Comparative Example 1.

In the present specification, the meaning of main terms is as follows.

Term 'nx' denotes a refractive index in a direction for a maximum refractive index in a film plane (X-axis direction), 'ny' denotes a refractive index in a direction orthogonal to the X-axis direction in the plane (Y-axis direction), and 'nz' denotes a refractive index in a direction orthogonal to the X-axis direction and Y-axis direction (the thickness direction). Here, nx≥ny.

'$\Delta n_{xz}$' denotes a birefringence index in the thickness direction of a film at a temperature of 23° C. and a wavelength of λ (nm) $\Delta n_{xz}$ may be calculated by $\Delta n_{xz}$=nx−nz.

'In-plane retardation value (Re(λ))' signifies an in-plane retardation value of a film at a temperature of 23° C. and a wavelength of λ (nm). The Re(λ) may be calculated by Re(λ)=(nx−ny)×d when the thickness of the film is regarded as d (nm).

'Retardation value (Rth(λ)) in the thickness direction' signifies a retardation value in the thickness direction of a film at a temperature of 23° C. and a wavelength of λ (nm). The Rth(λ) may be calculated by Rth(λ)=(nx−nz)×d when the thickness of the film is regarded as d (nm).

The 'polymer' includes a high polymer with a polymerization degree (the total polymerization degree of each unit in the case where the polymer includes a plurality of repeating units) of 20 or more as well as a low polymer with a polymerization degree of 2 or more and less than 20 (also called an oligomer).

The inventors of the present invention have found out that with regard to a film formed from the polyimide-based polymer represented by the general formula (I) or the general formula (I'), wavelength dispersion of a retardation value in a visible light range with a wavelength of 450 to 750 nm may become reverse dispersion. The present invention provides an optical film exhibiting reverse dispersion (that is, an optical film such that a retardation value is smaller on the shorter wavelength side) by exclusively utilizing the properties of the polymer.

[chemical formula 3]

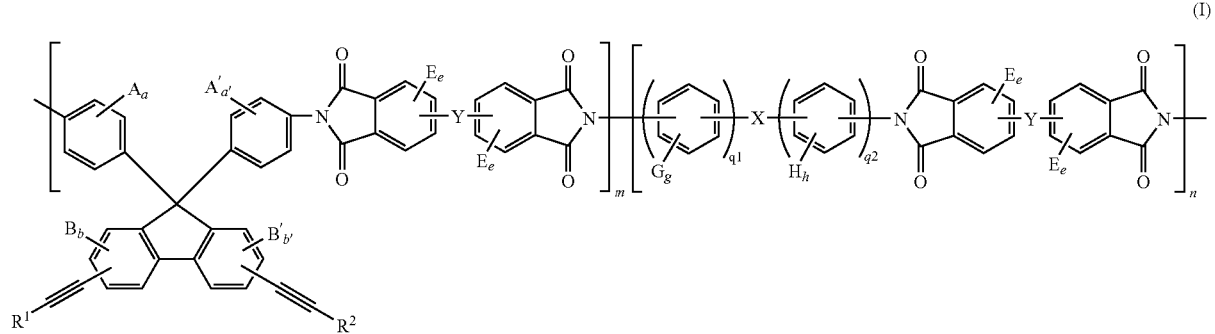

(I)

In the formula (I), m is 40% by mol or more and 100% by mol or less (m+n≤100% by mol). A, A', B, and B' each denote a substituent, a and a' denote substitution number of the corresponding A and A' (an integer of 0 to 4), and b and b' denote substitution number of the corresponding B and B' (an integer of 0 to 3). A, A', B, and B' each independently denote a halogen or an alkyl group having 1 to 4 carbon atoms, and are each identical or different in the case of being plural. $R^1$

[chemical formula 4]

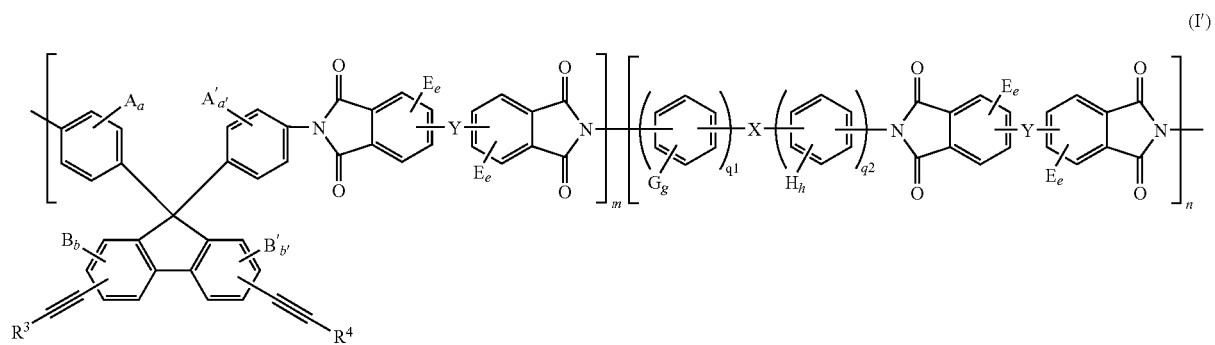

(I')

and $R^2$ each independently denote a substituent having a carbon-carbon double bond or a triple bond. X and Y each independently denote a covalent bond, or an atom or a group selected from the group consisting of a $CH_2$ group, a $C(CH_3)_2$ group, a $C(CZ_3)_2$ group (Z is a halogen), a CO group, an O atom, an S atom, an $SO_2$ group, an $Si(CH_2CH_3)_2$ group, and an $N(CH_3)$ group. E is a substituent and e denotes substitution number thereof (an integer of 0 to 3). E denotes an atom or a group selected from the group consisting of a halogen, an alkyl group having 1 to 3 carbon atoms, an alkyl halide group having 1 to 3 carbon atoms, a phenyl group, and a substituted phenyl group, and are each identical or different in the case of being plural. G and H are substituents, g denotes substitution number of G (an integer of 0 to 4), and h denotes substitution number of H (an integer of 0 to 4); G and H each independently denote an atom or a group selected from the group consisting of a halogen, an alkyl group, a substituted alkyl group, a nitro group, a cyano group, a thioalkyl group, an alkoxy group, an aryl group, a substituted aryl group, an alkyl ester group, and a substituted alkyl ester group, and are each identical or different in the case of being plural. Further, q1 denotes an integer of 0 to 3 and q2 denotes an integer of 1 to 3.

In the formula (I'), m is 70% by mol or more and 100% by mol or less (m+n≤100% by mol). In the formula (I'), $R^3$ and $R^4$ each independently denote an alkyl group having 1 to 10 carbon atoms or $CR^6R^7(OH)$ ($R^6$ and $R^7$ are each an alkyl group having 1 to 4 carbon atoms). In the formula (I'), Aa, A'a', Bb, B'b', X, Y, Gg, Hh, q1, q2, and Ee are the same as the formula (I).

It has been known that a film formed from a conventional polyimide-based polymer exhibits normal dispersion.

In this point, the polyimide-based polymer represented by the formula (I) has a diethynylfluorene skeleton as a side chain. With regard to this diethynylfluorene skeleton, the conjugated system of a fluorene skeleton is extended by a conjugated triple bond of an ethynyl group. In addition, the conjugated system of the diethynylfluorene skeleton is greatly widened by substituents ($R^1$ and $R^2$) having a carbon-carbon double bond or a triple bond, which are bonded to the ethynyl group. Then, with regard to the polyimide-based polymer represented by the formula (I), the diethynylfluorene skeleton (side chain) is aligned approximately orthogonal to the extension direction of a main chain. The diethynylfluorene skeleton (side chain) thus aligned becomes a great dispersion component, so that an optical film including the polyimide-based polymer of the formula (I) exhibits reverse dispersion. Also, the polyimide-based polymer of the formula (I) may be formed into an optical film exhibiting reverse dispersion even though the introduction amount of a repeating unit having the diethynylfluorene skeleton is comparatively small (m is 40% by mol or more).

Among the polyimide-based polymer represented by the formula (I), a polyimide-based polymer represented by the following formula (II) is preferable. Among the polyimide-based polymer represented by the formula (I'), a polyimide-based polymer represented by the following formula (II') is preferable.

With regard to the polyimide-based polymer of the formula (II) or the formula the conjugated system of a diethynyl group (the conjugated system of an ethynyl group extended from a fluorene skeleton to both sides) becomes approximately orthogonal to the extension direction of a main chain and is greatly extended toward both sides of the main chain. Thus, the polyimide-based polymer of the formula (II) or the formula (II') is appropriate as a forming material for an optical film exhibiting reverse dispersion.

[chemical formula 5]

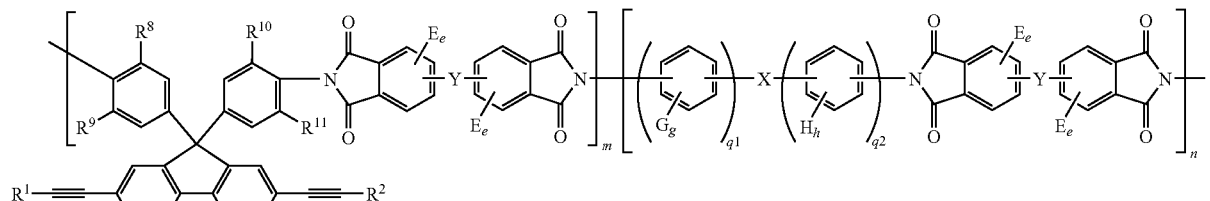

(II)

[chemical formula 5]

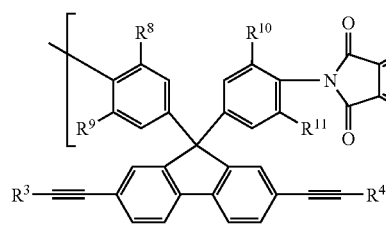

(II')

$R^1$ and $R^2$ in the formula (I) are selected from the group consisting of a substituted or unsubstituted aryl group, a substituted or unsubstituted vinyl group, and a substituted or unsubstituted ethynyl group. In view of being capable of widening the conjugated system of the diethynylfluorene more greatly, $R^1$ and $R^2$ in the formula (I) are preferably a substituted or unsubstituted aryl group (preferably an aryl group with 1 to 3 pieces of aromatic rings) or a vinyl group having an aryl group as a substituent, more preferably a substituted or unsubstituted aryl group (preferably an aryl group with 1 or 2 pieces of aromatic rings).

On the other hand, $R^3$ and $R^4$ in the formula (I') are not conjugated substituents. Thus, with regard to the polyimide-based polymer of the formula (I'), the extent of the conjugated system in a side chain is small as compared with the polyimide-based polymer of the formula (I). Accordingly, the polyimide-based polymer of the formula (I') offers small function of the conjugated system of a diethynylfluorene skeleton occupying the whole polymer, but yet offers a comparatively large introduction amount of a repeating unit having a diethynylfluorene skeleton (m is 70% by mol or more). Therefore, an optical film including a polyimide-based polymer of the formula (I') exhibits reverse dispersion.

In the formula (II) and the formula (II'), $R^8$ to $R^{11}$ each independently denote hydrogen or an alkyl group having 1 to 4 carbon atoms (a methyl group is preferable). In the formula (II) and the formula (II'), X, Y, Gg, Hh, q1, q2, and Ee are the same as the formula (I). Further, in the formula (II), $R^1$ and $R^2$ are the same as the formula (I). In the formula (II'), $R^3$ and $R^4$ are the same as the formula (I').

It is preferable that at least one of $R^8$ and $R^9$ in the formula (II) and the formula (II') is a methyl group and at least one of $R^{10}$ and $R^{11}$ thereof is a methyl group. Such a polyimide-based polymer is excellent in transparency and solvent solubility.

The m (the introduction amount of a repeating unit having a diethynylfluorene skeleton) in the formula (I) and the formula (II) is 40% by mol or more and preferably 50% by mol or more of the whole polymer. Also, m in the formula (I) and the formula (II) is 100% by mol or less. The polyimide-based polymer represented by the formula (I) or the formula (II) may be formed into an optical film exhibiting steeper reverse dispersion as the introduction amount of a repeating unit having a diethynylfluorene skeleton is larger.

The n in the formula (I) and the formula (II) is 60% by mol or less and preferably 50% by mol or less. Also, the n is 0% by mol or more.

The m (the introduction amount of a repeating unit having a diethynylfluorene skeleton) in the formula (I') and the formula (II') is 70% by mol or more and preferably 75% by mol or more of the whole polymer. Also, m in the formula (I') and the formula (II') is 100% by mol or less. The polyimide-based polymer represented by the formula (I') or the formula (II') may be formed into an optical film exhibiting steeper reverse dispersion as the introduction amount of a repeating unit having a diethynylfluorene skeleton is larger.

The n in the formula (I') and the formula (II') is 30% by mol or less and preferably 25% by mol or less. Also, the n is 0% by mol or more.

In addition, a constitutional unit represented by the following formula (a) in the formula (I) and the formula (I') is preferably a constitutional unit represented by the following formula (b). The polyimide-based polymer having the constitutional unit of the formula (b) is excellent in transparency.

In the formula (b), E is the same as the formula (I) and preferably a halogen such as chlorine.

Further, the constitutional unit represented by the following formula (c) in the formula (I) and the formula (I') is preferably a constitutional unit represented by the following formula (d).

[chemical formula 9]

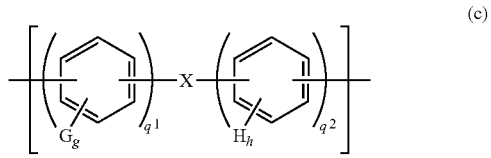

[chemical formula 10]

[chemical formula 7]

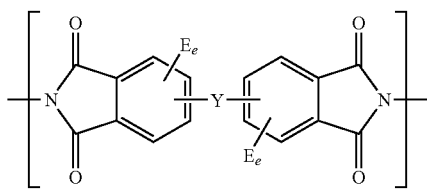

[chemical formula 8]

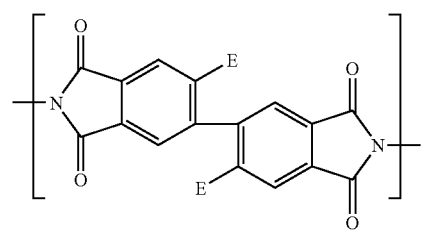

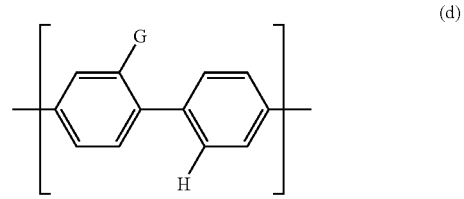

In the formula (d), G and H are the same as the formula (I) and preferably a substituted alkyl group such as an alkyl halide group (such as $CF_3$).

Among the polyimide-based polymer represented by the formula (I), a polyimide-based polymer represented by the following general formula (III) is more preferable. Among the polyimide-based polymer represented by the formula (I'), a polyimide-based polymer represented by the following general formula (III') is more preferable.

[chemical formula 11]

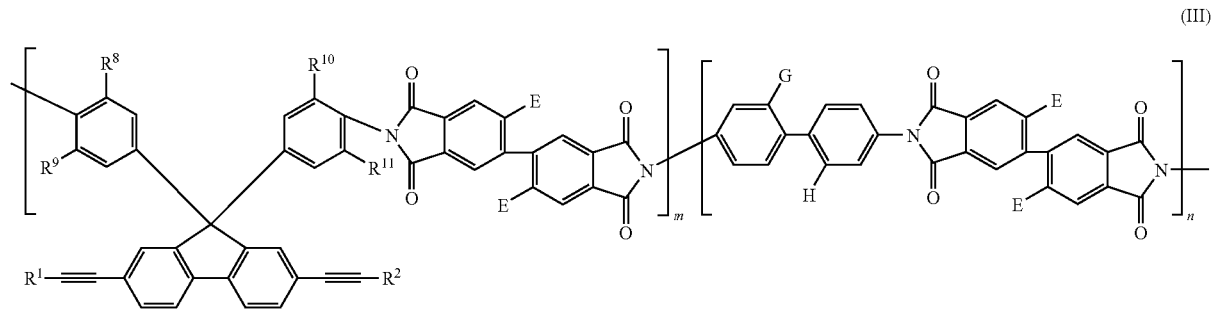

In the formula (III), $R^1$, $R^2$, E, G, and H are the same as the formula (I) and $R^8$ to $R^{11}$ are the same as the formula (II).

[chemical formula 12]

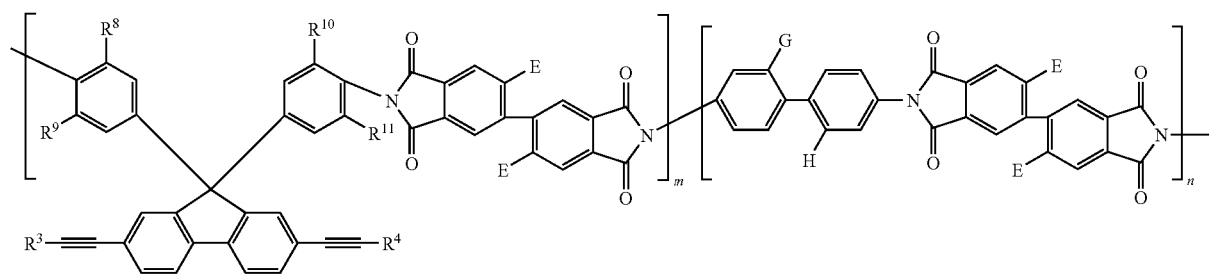

(III')

In the formula (III'), $R^3$, $R^4$, E, G, and H are the same as formula (I') and $R^8$ to $R^{11}$ are the same as the formula (II').

The polyimide-based polymer of the present invention has predetermined amount of repeating units having the diethynylfluorene skeleton (40% by mol or more in the formula (I) and 70% by mol or more in the formula (I')). The polyimide-based polymer of the present invention may have other repeating unit in addition to this repeating unit. The other repeating unit is, for example, a repeating unit represented by the following formula (e).

[chemical formula 13]

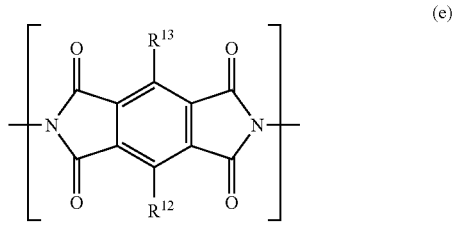

(e)

In the formula (e), $R^{12}$ and $R^{13}$ each independently denote an atom or a group selected from the group consisting of hydrogen atom, a halogen, a phenyl group, a substituted phenyl group, an alkyl group, and a substituted alkyl group. Among them, $R^{12}$ and $R^{13}$ each preferably denote an alkyl halide group independently.

The weight-average molecular weight (Mw) of the polyimide-based polymer of the present invention is not particularly limited, but preferably in the range of 1,000 to 1,000,000 and more preferably 2,000 to 500,000. The polyimide-based polymer in which the weight-average molecular weight thereof is within the above range is excellent in solvent solubility, and may be formed into an optical film such that cracks due to expansion, contraction, and distortion are caused with difficulty, and the optical film has sufficient strength.

Also, a glass transition temperature of the polyimide-based polymer of the present invention may be properly set by adjusting variety of the main chain and the introduction amount of the each repeating unit in the formula (I) or the formula (I'). The glass transition temperature of the polyimide-based polymer is preferably 100° C. or more and more preferably 130° C. or more. A film obtained by forming the polyimide-based polymer, which has the glass transition temperature in the above range, into a film has sufficient heat resistance. The glass transition temperature can be determined by a DSC method according to JIS K 7121 (1987).

The polyimide-based polymer represented by the formula (I) may be obtained by introducing predetermined amount of a diethynylfluorene represented by the following general formula (f) into a polyimide. The polyimide-based polymer represented by the formula (I') may be obtained by introducing predetermined amount of a diethynylfluorene represented by the following general formula (f') into a polyimide.

Also, the polyimide-based polymer represented by the formula (II) may be obtained by introducing predetermined amount of a diethynylfluorene represented by the following general formula (g) into a polyimide. The polyimide-based polymer represented by the formula (II') may be obtained by introducing predetermined amount of a diethynylfluorene represented by the following general formula (g') into a polyimide.

[chemical formula 14]

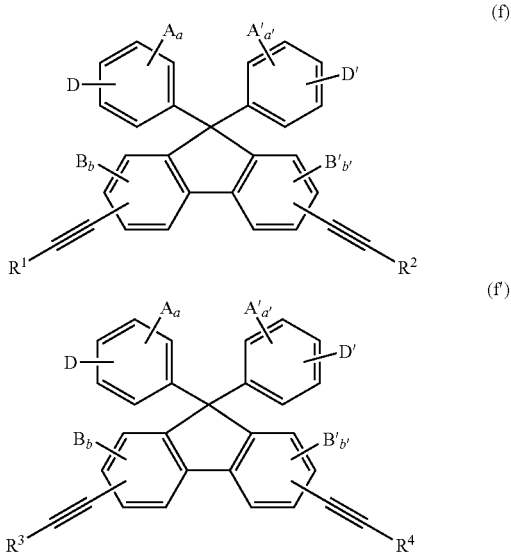

In the formula (f) and the formula (f'), D and D' each independently denote an OH group, an NHR group (wherein this R denotes hydrogen or an alkyl group having 1 to 4 carbon atoms), a COOH group, or an NCO group. In the formula (f), $R^1$, $R^2$, Aa, A'a', Bb, and B'b' are the same as the formula (I). In the formula (f'), $R^3$, $R^4$, Aa, A'a', Bb, and B'b' are the same as the formula (I').

[chemical formula 15]

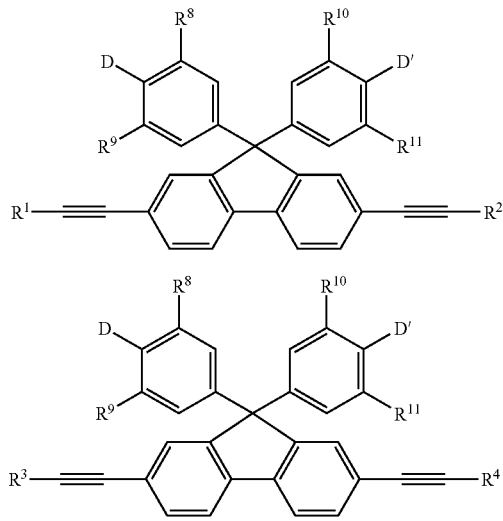

[chemical formula 16]

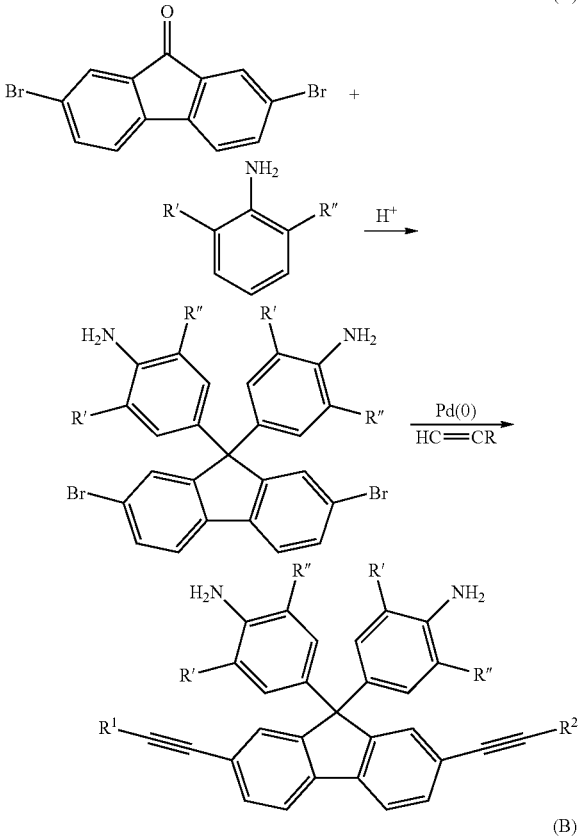

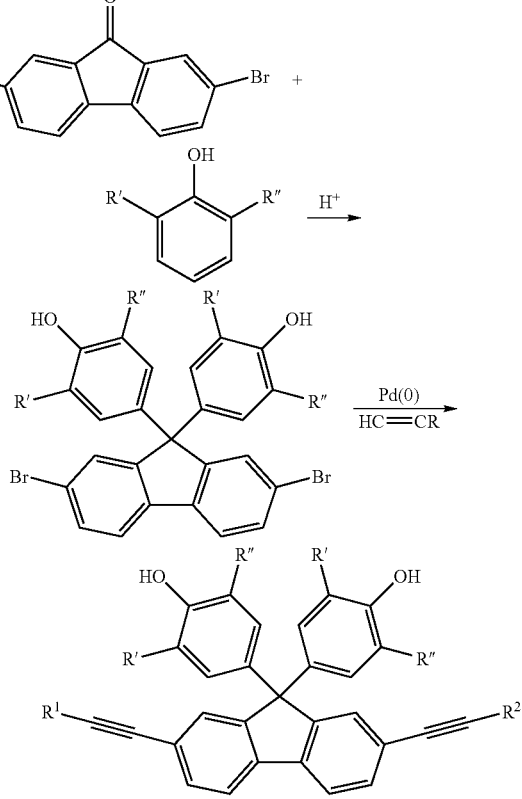

In the formula (g) and the formula (g'), D and D' each independently denote an OH group, an NHR group (wherein this R denotes hydrogen or an alkyl group having 1 to 4 carbon atoms), a COOH group, or an NCO group. In the formula (g), $R^1$, $R^2$, Aa, A'a', Bb, and B'b' are the same as the formula (II). In the formula (g'), $R^3$, $R^4$, Aa, A'a', Bb, and B'b' are the same as the formula (II').

The D and D' in the formula (f) and the like denote a bonding group. The D and D' are preferably an $NH_2$ group by reason of being capable of reacting with acid to easily form an imide bond, for example.

Examples of the diethynylfluorene include fluorene having an alkylethynyl group; fluorene having an arylethynyl group such as a phenylethynyl group, a biphenylethynyl group, a naphthylethynyl group, an anthrylethynyl group, or a phenanthrylethynyl group; and fluorene having an vinylethynyl group; and the like.

Specific examples of the fluorene having the alkylethynyl group include 9,9-bis(4-aminophenyl)-2,7-dihexylethynylfluorene, 9,9-bis(4-aminophenyl)-2,7-dipentylethynylfluorene, 9,9-bis(4-aminophenyl)-2,7-diheptylethynylfluorene, and the like.

Specific examples of the fluorene having the arylethynyl group include 9,9-bis(4-aminophenyl)-2,7-bis(phenylethynyl)fluorene and the like.

Moreover, examples of the diethynylfluorene include 9,9-bis(3-methyl-4-aminophenyl)-2,7-bis(2-hydroxy-2-methyl-3-butynyl)fluor ene and the like.

Each of the diethynylfluorene may be produced by the following method, for example.

2,7-dibromofluorene is reacted with an aniline derivative under the presence of an acid catalyst. Diethynylfluorene having an amino group may be obtained by reacting the intermediate obtained by the above reaction with an ethynyl compound under the presence of a palladium (0) catalyst (following reaction formula (A)).

Further, diethynylfluorene having a hydroxyl group may be obtained by replacing the above aniline derivative with a phenol derivative (following reaction formula (B)).

When $R^1$ of the reaction formulae (A) and (B) is changed into $R^3$ and $R^2$ thereof is changed into $R^4$, diethynylfluorene represented by the formulae (f') and (g') can be obtained.

The polyimide-based polymer may be obtained by reacting diethynylfluorene described above, acid dianhydride, and diamine, for example. Specifically, diethynylfluorene, acid dianhydride, and diamine are mixed at predetermined molar ratio while dissolved in a proper solvent, and thereafter stirred at room temperature for predetermined time to produce polyamic acid. Next, acetic anhydride and pyridine are added thereto and heated as required to imidize the polyamic acid while stirred. The obtained polyimide is cooled to room temperature and purified with a proper solvent. The polyimide-based polymer of the present invention may be obtained by washing and drying the purified product.

As the acid dianhydride, for example, aromatic tetracarboxylic dianhydride may be cited. As the aromatic tetracarboxylic dianhydride, for example, pyromellitic dianhydride, benzophenonetetracarboxylic dianhydride, naphthalene tetracarboxylic dianhydride, heterocyclic aromatic tetracarboxylic dianhydride, 2,2'-substituted biphenyltetracarboxylic dianhydride, and the like may be cited. As the pyromellitic dianhydride, for example, pyromellitic dianhydride, 3,6-diphenylpyromellitic dianhydride, 3,6-bis(trifluoromethyl) pyromellitic dianhydride, 3,6-dibromopyromellitic dianhydride, 3,6-dichloropyromellitic dianhydride, and the like may be cited. As the benzophenonetetracarboxylic dianhydride, for example, 3,3',4,4'-benzophenonetetracarboxylic dianhydride, 2,3,3',4'-benzophenonetetracarboxylic dianhydride, 2,2',3,3'-benzophenonetetracarboxylic dianhydride, and the like may be cited. As the naphthalene tetracarboxylic dianhydride, for example, 2,3,6,7-naphthalene-tetracarboxylic dianhydride, 1,2,5,6-naphthalene-tetracarboxylic dianhydride, 2,6-dichloro-naphthalene-1,4,5,8-tetracarboxylic dianhydride, and the like may be cited. As the heterocyclic aromatic tetracarboxylic dianhydride, for example, thiophene-2,3,4,5-tetracarboxylic dianhydride, pyrazine-2,3,5,6-tetracarboxylic dianhydride, pyridine-2,3,5,6-tetracarboxylic dianhydride, and the like may be cited. As the 2,2'-substituted biphenyltetracarboxylic dianhydride, for example, 2,2'-dibromo-4,4',5,5'-biphenyltetracarboxylic dianhydride, 2,2'-dichloro-4,4',5,5'-biphenyltetracarboxylic dianhydride, 2,2'-bis(trifluoromethyl)-4,4',5,5'-biphenyltetracarboxylic dianhydride, and the like may be cited.

Further, as other examples of the aromatic tetracarboxylic dianhydride, for example, 3,3',4,4'-biphenyltetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl) ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride, and the like may be cited.

Among them, as for the aromatic tetracarboxylic dianhydride, substituted biphenyl tetracarboxylic dianhydride is preferable, and 1,1'-dichloro-3,3',4,4'-biphenyl tetracarboxylic dianhydride is more preferable.

As the diamine, for example, aromatic diamine may be cited. As specific examples of the aromatic diamine, for example, benzene diamine, diaminobenzophenone, naphthalene diamine, heterocyclic aromatic diamine, and the like may be cited.

As the benzenediamine, for example, o-, m- or p-phenylenediamine, 2,4-diaminotoluene, 1,4-diamino-2-methoxybenzene, 1,4-diamino-2-phenylbenzene, 1,3-diamino-4-chlorobenzene, and the like may be cited. As the diaminobenzophenone, for example, 2,2'-diaminobenzophenone, 3,3'-diaminobenzophenone, and the like may be cited. As the naphthalenediamine, for example, 1,8-diaminonaphthalene, 1,5-diaminonaphthalene, and the like may be cited. As the heterocyclic aromatic diamine, for example, 2,6-diaminopyridine, 2,4-diaminopyridine, 2,4-diamino-5-triazine, and the like may be cited.

In addition, as other examples of the aromatic diamine, for example, 4,4'-diaminobiphenyl, 4,4'-diaminodiphenylmethane, 4,4'-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5,5'-tetrachlorobenzidine, 2,2-bis(4-aminophenoxyphenyl) propane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy) biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, and the like may be cited.

Among them, as for the diamine, 2,2'-bis(trifluoromethyl)-4,4'-diaminobiphenyl and the like is preferable.

The optical film of the present invention may be obtained by forming a forming material including the polyimide-based polymer into a film.

Another polymer having constitution different from the polyimide-based polymer of the present invention may be added to a forming material of the optical film in addition to the polyimide-based polymer of the present invention. The another polymer can be blended as far as an aligning property of the polyimide-based polymer is not deteriorated.

As examples of another polymer, for example, various general-purpose resins, engineering plastics, thermoplastic resins, thermosetting resins, and the like may be cited. As the general-purpose resins, for example, polyethylene, polypropylene, polystyrene, polymethyl methacrylate, acrylonitrile-butadiene-styrene resins, acrylonitrile-styrene resins, and the like may be cited. As the engineering plastics, for example, polyacetate, polycarbonate, polyamide (nylon), polyethylene terephthalate, polybutylene terephthalate, and the like may be cited. As the thermoplastic resins, for example, polyphenylene sulfide, polyethersulfone, polyketone, polyimide, polycyclohexane dimethanol terephthalate, polyarylate, liquid crystal polymers, and the like may be cited. As the thermosetting resins, for example, epoxy resins, phenol novolac resins, and the like may be cited. A blending amount of these polymers in the forming material is, for example, from 0 to 50% by mass and preferably from 0 to 30% by mass.

Also, the forming material may be added various kinds of additives such as a stabilizer, a plasticizer, and an additives containing metals, as required.

The thickness of the optical film of the present invention is not particularly limited, but generally 200 μm or less. Particularly, the thickness of the optical film is preferably 20 μm or less, more preferably 15 μm or less, and particularly preferably 10 μm or less, for the reason that thinning an image display device can be achieved. On the other hand, lower limit of the thickness of the optical film may be set arbitrary so as to obtain a desired retardation value. The thickness of the optical film is generally 1 μm or more and preferably 2 μm or more. The polyimide-based polymer of the present invention may be formed into a film by coating. Accordingly, an optical film including the polyimide-based polymer of the present invention may be formed comparatively thin.

The producing method for the optical film of the present invention is not particularly limited and, for example, the optical film may be produced by forming the above forming material including the polyimide-based polymer into a film and drawing (or contracting) as required. The film-forming may be performed by coating the forming material on a proper base material.

Examples of the coating method for the above forming material include a method for coating the forming material on a base material by heating to dissolve, a method for coating polymer solution prepared by dissolving the forming material in a solvent on a base material. The above method for coating polymer solution is preferable in view of production efficiency, molecular alignment control, and optical anisotropy control.

In particular, a coating film exhibiting negative uniaxial (an index ellipsoid satisfies nx≈ny>nz) may be formed by coating a polymer solution containing the polyimide-based polymer of the present invention on a base material.

Specifically, polymer solution containing the polyimide-based polymer of the present invention is coated on a base material and thereafter dried while shrinkage force is applied on the plane of a coating film (in the X-axis direction and the Y-axis direction), and a coating film exhibiting negative uniaxial can be formed. Thus, the polyimide-based polymer of the present invention may be formed into a coating film exhibiting optical uniaxial by coating on a base material regardless of the presence or absence of alignment of the base material.

Here, 'nx≈ny' includes not only the case where nx and ny are completely identical but also the case where nx and ny are substantially identical. The case where nx and ny are substantially identical signifies, for example, that Re(590) is 0 nm to 10 nm and preferably 0 nm to 5 nm.

The polymer solution may be prepared by dissolving the polyimide-based polymer of the present invention (as required, blending other polymers and various kinds of additives) in an appropriate solvent. The polyimide-based polymer of the present invention is so excellent in solvent solubility that the polymer solution may be easily prepared.

The solvent is not particularly limited as far as the solvent can dissolve the polyimide-based polymer of the present invention and arbitrary selected. The solvent includes, for example, an organic solvent. Examples of the organic solvent include halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol and para-chlorophenol; aromatic hydrocarbons such as benzene, toluene, xylene, methoxybenzene, and 1,2-dimethoxybenzene; ketones such as acetone, methyl ethyl ketone, methyl isobutyl ketone, cyclohexanone, cyclopentanone, 2-pyrrolidone, and N-methyl-2-pyrrolidone; esters such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amides such as dimethylformamide and dimethylacetoamide; nitriles such as acetonitrile and butyronitrile; ethers such as diethyl ether, dibutyl ether, and tetrahydrofurane; carbon disulfide; cellosolves such as ethylcellosolve and butylcellosolve. These solvents may be used alone or in the form of a mixture of two or more thereof.

The polymer solution may be blended preferably in the range of 5 to 50 parts by mass, and more preferably from 10 to 40 parts by mass with respect to 100 parts by mass of the solvent. The polymer solution having a concentration within the above range may have appropriate viscosity for coating.

Also, examples of method for coating the polymer solution include a spin coating method, a roll coating method, a flow coating method, a print method, a dip coating method, a coating film-forming method, a bar coating method, a gravure printing method, and the like.

After the polymer solution is coated on a base material, the coating film may be dried. The drying treatment is performed by natural drying, air drying, drying by heating, and the like, for example. When the drying by heating is adopted, heating temperature is not particularly limited, but from 25 to 250° C. and preferably from 40 to 200° C.

The solvent amount remaining in the coating film (namely, an optical film) finally obtained is preferably 1% by mass or less and more preferably 0.5% by mass or less. The reason therefor is that the film with a small remaining solvent amount is so excellent in dimensional stability that the change of optical property with time is caused with difficulty.

The base material to be coated with the forming material (the polymer solution and the like) is not particularly limited, and may be a base material made of a synthetic resin or made of an inorganic compound such as a glass base material and a silicon wafer. As examples of the base material made of a synthetic resin, a film produced by the cast method; a film produced in such a manner that a molten polymer is formed into a film and thereafter subjected to drawing treatment; and the like may be cited. Among these, a film to which drawing treatment is performed is preferable, for the reason that the forming material can be coated accurately.

Further, a base material excellent in transparency is preferable. The use of the base material excellent in transparency allows an optical film formed on the base material to be used directly without being peeled off the base material.

As the resin component of the base material, for example, acetate resins such as triacetyl cellulose (TAC), polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinyl alcohol resins, polyvinyl chloride resins, polyvinylidene chloride resins, liquid crystal polymers, mixtures thereof, and the like may be cited. Further, the resin component may be a mixture of a thermoplastic resin having a substituted imide group or a non-substituted imide group on the side chain and a thermoplastic resin having a substituted phenyl group or a non-substituted phenyl group and a nitrile group on the side chain (these mixtures are described in Japanese Unexamined Patent Publication No. 2001-343529).

The thickness of the base material is, for example, 12 µm to 200 µm, preferably 20 µm to 150 µm, and more preferably 25 µm to 100 µm. In the case where the base material has a thickness of 12 µm or more, the polymer solution may be coated accurately. On the other hand, in the case where the base material has a thickness of 200 µm or less, distortion amount of the optical film may be further restricted.

A coating film exhibiting optical uniaxial may be formed by coating the forming material including the polyimide-based polymer of the present invention on the base material. This coating film is the optical film of the present invention. The optical film of the present invention is thin and exhibits optical uniaxial (index ellipsoid thereof exhibits nx≈ny>nz). The optical film may be used as a retardation film.

Further, an optical film exhibiting optical biaxial (index ellipsoid thereof exhibits nx>ny>nz) may be formed by drawing or contracting the coating film.

As a drawing method of the coating film, for example, a free-end longitudinal stretching method of uniaxially stretching in a longitudinal direction of the film, a fixed-end transverse stretching method of uniaxially stretching in a width direction with the film fixed in a longitudinal direction may be preferably cited. As other drawing method, for example, a biaxial stretching method of sequential or simultaneous stretching in both a longitudinal direction and a width direction may be cited. In the case where the base material on which the coating film is formed is a base material, which can be drawn, the coating film is preferably drawn by drawing the base material. According to this drawing method, the base material can be drawn uniformly, thus the coating film can be drawn indirectly and uniformly corresponding to the drawing of the base material. Also, this drawing method is applicable to continuous production process and preferable in terms of improving mass productivity of products. The base material and the coating film may be drawn concurrently.

Further, in the case where the base material on which the coating film is formed is a contractable base material, the contraction of the base material allows the contraction of the coating film to be indirectly performed. On this occasion, the contraction percentage of the base material is preferably controlled by utilizing a drawing machine or the like. As examples of the control method, a method for temporarily releasing a clip of a drawing machine to relax in the transfer direction of the above base material, a method for gradually narrowing the interval of a clip of a drawing machine, and the like may be cited.

The retardation value ($Rth(\lambda)$) in the thickness direction and the in-plane retardation value ($Re(\lambda)$) of the optical film of the present invention may be adjusted properly. This adjustment may be performed by setting constitution and molecular weight of the polymer material which is used for or adjusting thickness or drawing (or construction) ratio when film is formed.

The wavelength dispersion of the optical film including the polyimide-based polymer of the present invention becomes reverse dispersion. Specifically, the optical film of the present invention satisfies relationships of $Rth(450)/Rth(550) \leq 0.98$ and $Rth(650)/Rth(550) \geq 1.02$. Particularly, in the polyimide-based polymer, an optical film exhibiting steeper reverse dispersion, such that $Rth(450)/Rth(550) \leq 0.8$, may be formed by increasing the introduction amount of a repeating unit having a diethynylfluorene.

The optical film of the present invention exhibits $0.4 \leq Rth(450)/Rth(550) \leq 0.98$ and preferably $0.7 \leq Rth(450)/Rth(550) \leq 0.97$. Also, the optical film of the present invention exhibits $1.50 \geq Rth(650)/Rth(550) \geq 1.02$ and preferably $1.30 \geq Rth(650)/Rth(550) \geq 1.10$.

An optical film including a conventionally known polyimide-based polymer exhibits wavelength dispersion such that a retardation value is larger on the shorter wavelength side (normal dispersion). Specifically, the optical film including a conventionally known polyimide-based polymer generally satisfies relationships of $Rth(450)/Rth(550) > 1.06$ and $Rth(650)/Rth(550) < 0.95$. An optical film including a polyimide-based polymer, into which a fluorene skeleton having no diethynyl group is introduced, exhibits normal dispersion in the same way.

However, the optical film of the present invention including a polyimide-based polymer, into which a fluorene skeleton having a diethynyl group is introduced, exhibits reverse dispersion. This knowledge is first obtained by the inventors of the present invention.

Also, in the case where the index ellipsoid of the optical film of the present invention satisfies a relationship of $nx > ny > nz$, the in-plane retardation value of the optical film satisfies relationships of $Re(450)/Re(550) \leq 0.98$ and $Re(650)/Re(550) \geq 1.02$.

The birefringence index of the optical film of the present invention can be set appropriately by the introduction amount of the repeating unit of the diethynylfluorene, constitution of constitutional unit of polyimide, and the like. The birefringence index ($\Delta n_{xz}(550)$) of the optical film of the present invention at a wavelength of 550 nm is preferably 0.01 or more, more preferably from 0.003 to 0.070, and particularly preferably 0.005 to 0.055.

The optical film of the present invention is used for arbitrary appropriate applications. As typical applications of the optical film of the present invention is a retardation film. The retardation film is used as a $\lambda/4$ plate, a $\lambda/2$ plate, and a viewing angle expansion film, which are used for a liquid crystal display. Other application of the optical film includes an antireflection film mounted on an image display device. Examples of the image display device include a liquid crystal display, an organic EL display, a plasma display, and the like.

The optical film of the present invention can be used as form of an optical laminated body in which other optical member is laminated. As the optical laminated body, for example, a laminated body (this laminated body is generally called polarizing plate) prepared by laminating a polarizer having a protective layer on the optical film of the present invention and a laminated body prepared by laminating other retardation film on the optical film of the present invention may be cited.

The layers, which compose these laminated bodies, are generally adhered by well-known adhesives (or pressure sensitive adhesives). As the adhesives, for example, a solvent adhesive, an emulsion adhesive, a pressure sensitive adhesive, a rewet adhesive, a polycondensation adhesive, a solventless adhesive, a film form adhesive, a hot-melt adhesive, and the like may be cited.

The polarizer is an optical member which can convert a natural light or a polarized light into a linear polarized light. The polarizer is not particularly limited and appropriate and proper polarizer is adopted. The polarizer is preferably a drawn film including a vinyl alcohol-based polymer, which contains iodine or a dichroic dye, as a main component. The thickness of the polarizer is generally 5 μm to 50 μm. The protective layer is adhered to the polarizer for preventing constriction or expansion of the polarizer and degradation of the polarizer by the ultraviolet rays. As the protective layer, a polymer film including a cellulose-based polymer or a norbornene-based polymer is preferably used. The thickness of the protective layer is generally from 10 μm to 200 μm. The protective layer may combine with a base material when the optical film of the present invention is formed.

The image display device of the present invention has the optical film of the present invention.

The image display device of the present invention may be a constitution which is the same as a conventional image display device except that the optical film of the present invention is mounted on a liquid crystal panel.

The image display device of the present invention is used for proper and appropriate applications. When the application is a liquid crystal display, for example, office automation equipments such as a personal computer monitor, a notebook computer and a copying machine; portable equipments such as a portable telephone, a watch, a digital camera, a personal digital assistant (PDA), and a portable game machine; domestic electrical equipments such as a video camera and a microwave oven; on-vehicle equipments such as a back monitor, a monitor for a car navigation system, and a car audio; display equipments such as an information monitor for a commercial store; security equipments such as an observation monitor; and care/medical equipments such as a care monitor and a medical monitor may be cited as applications.

The image display device containing the optical film of the present invention includes a liquid crystal display, an organic light emitting display, a plasma display, and the like. The preferable application of the image display device is a TV set. The screen size of the TV set is preferably wide 17 type (373 mm×224 mm) or more, more preferably wide 23 type (499 mm×300 mm) or more, and particularly preferably wide 32 type (687 mm×412 mm) or more.

EXAMPLES

Next, the present invention is described in detail with reference to Examples and Comparative Examples. However, the present invention is not limited to the following Examples.

Each analytical method used in Examples and Comparative Examples is as follows.

(Identification of Chemical Constitution)

The chemical constitution was identified by using a nuclear magnetic resonance spectrometer [product name: AVANCEII300, manufacture by Bruker Japan Co., Ltd.] (measurement solvent; deuterated chloroform or deuterated DMSO, frequency; 300 MHz, observation nucleus; $^1H$, $^{13}C$, measured temperature; 25° C.). Hereinafter, this method is described as NMR.

(Measurement of Infrared Absorption Spectrum)

The infrared absorption spectrum was measured by using an infrared spectral photometer [product name: FT/IR-470plus, manufactured by JASCO Corporation].

(Measurement of Glass Transition Temperature)

The glass transition temperature was measured by using a differential scanning calorimeter [trade name: DSC-6200, manufactured by Seiko Instruments Inc.] by a method according to JIS K 7121 (1987) (method of measuring a transition temperature of plastics). Specifically, 3 mg of a powder sample was heated (heating speed; 10° C./min) under nitrogen atmosphere (flow rate of gas; 50 ml/min) to raise the temperature of the sample, thereby measuring the glass transition temperature twice to adopt the second data. The temperature of the calorimeter was calibrated by using a standard material (indium).

(Measurement of Weight-average Molecular Weight)

Each measurement sample was prepared to 0.1%-DMF solution and filtered through a 0.45-μm membrane filter to thereafter measure weight-average molecular weight by using a GPC itself with built-in a detector (RI) (HLC-8120GPC, manufactured by Tosoh Corporation). Specifically, the column temperature was 40° C. and the pump flow rate was 0.40 mL/minute, and the molecular weight of the measurement sample was calculated from the molecular weight converted into polyethylene oxide by using the calibration curve of standard polyethylene oxide with the molecular weight thereof known previously. The used column was such that super AWM-H (diameter 6.0 mm×15 cm), super AW4000 (diameter 6.0 mm×15 cm) and super AW2500 (diameter 6.0 mm×15 cm) were connected in series. The used mobile phase was such that 10 mmol LiBr and 10 mmol phosphoric acid were put in a measuring flask to add DMF thereto and determine the total amount at 1 L.

(Measurement of $\Delta n_{xz}$ and $Rth(\lambda)$)

$\Delta n_{xz}$ and the like were measured by using an instrument, trade name 'KOBRA-WPR', manufactured by Oji Scientific Instruments at a temperature of 23° C. and a wavelength of λ.

$Rth(\lambda)$ was calculated in such a manner that light with a wavelength of λ was made to enter at an angle of 40° with the sample normal direction to convert the measured value (R40λ) into $Rth(\lambda)$.

(Measurement of Refractive Index)

The refractive index was measured by using an Abbe refractometer [trade name 'DR-M4', manufactured by ATAGO Co., Ltd.].

(Measurement of Thickness)

The thickness was measured by using an instrument, trade name of 'Dektak', manufactured by SLOAN.

Example 1

Synthesis of Diethynylfluorene 0.43 g of bis(benzonitrile)dichloropalladium (II) and 0.14 g of copper iodide (I) were dissolved in 19 mL of dioxane under nitrogen atmosphere. 4.70 g of tri(t-butylphosphine), 4.54 g of diisopropylamine, 3.78 g of 2-methyl-3-butyne-2-ol, and 10.0 g of 2,7-dibromo-9,9-bis(3-methyl-4-aminophenyl)fluorene were added thereto and stirred at room temperature for 24 hours. Thereafter, the solvent was removed under reduced pressure and the residual was purified by a silica gel packed column using a developing solvent (mixed solvent of hexane and ethyl acetate) to obtain 9.80 g of a compound. When measured by NMR, the obtained compound was 9,9-bis(3-methyl-4-aminophenyl)-2,7-bis(2-hydroxy-2-methyl-3-butynyl)fluorene represented by the following formula (1).

[chemical formula 17]

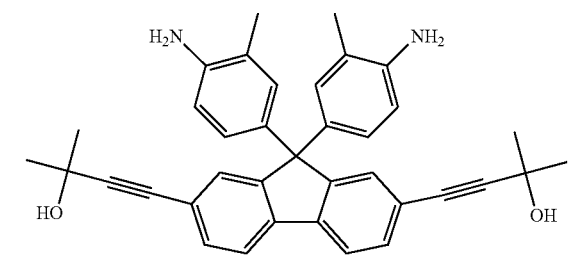

(1)

(Synthesis of Polymer)

0.39 g of 9,9-bis(3-methyl-4-aminophenyl)-2,7-bis(2-hydroxy-2-methyl-3-butynyl)fluorene, 0.08 g of 2,2'-bis(trifluoromethyl)-4,4'-diaminobiphenyl, and 0.35 g of 1,1'-dichlorobiphenyl-3,3',4,4'-tetracarboxylic dianhydride were dissolved in 1.91 g of DMAC under nitrogen atmosphere and stirred at room temperature for 7 hours. Thereafter, 5.46 g of DMAC was added thereto, and 0.18 g of pyridine and 0.24 g of acetic anhydride were further added thereto and stirred for 16 hours.

The obtained reaction solution was dropped into isopropyl alcohol (IPA) to perform reprecipitation. The obtained polymer was filtered and washed with IPA twice to thereby obtain 0.57 g of a white polymer. It was confirmed by NMR that the obtained polymer was polyimide represented by the following formula (2) (in which, m:n=72:28). The weight-average molecular weight of this polymer was 31,600 and the glass transition temperature thereof was 177.9° C.

[chemical formula 18]

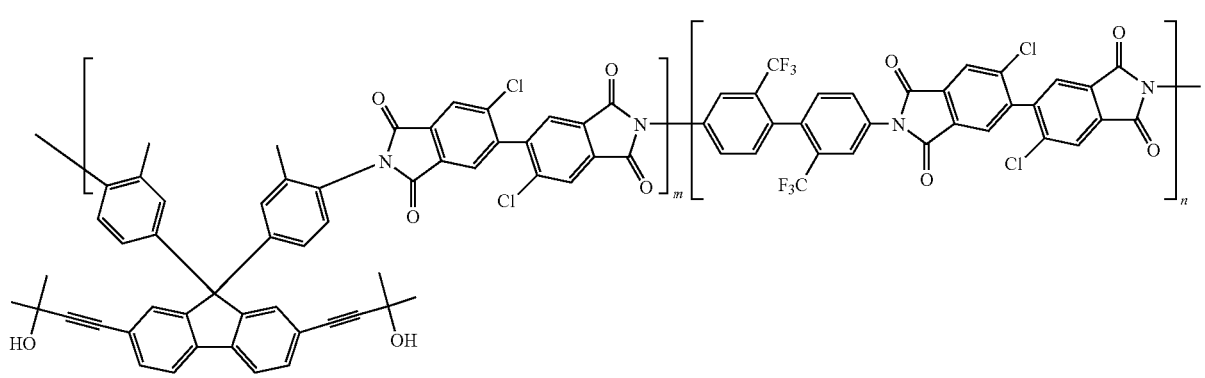

(2)

(Production of Film)

The obtained polymer was dissolved in cyclohexanone, coated on a glass plate by the spin coating method, dried at a temperature of 80° C. for 5 minutes, and thereafter further dried at a temperature of 150° C. for 30 minutes to produce a polyimide film. The dry thickness of this film was 8.39 μm.

The birefringence index ($\Delta n_{xz}$) of the obtained film at wavelength of 550 nm was 0.0079 (see Table 1).

The wavelength dispersion of retardation value in the thickness direction of this film was measured. The results are shown in FIG. 1.

Rth(450)/Rth(550) of Example 1 was 0.95 and Rth(650)/Rth(550) of Example 1 was 1.02. In Table 1, '$n_d$' denotes refractive index measured by sodium D line (589 nm) (hereinafter, '$n_d$' of each of Example and Comparative Example is the same).

TABLE 1

| | Fluorene introduction amount | $n_d$ | Rth(450)/Rth(550) | Rth(650)/Rth(550) | $\Delta n_{xz}$ |
|---|---|---|---|---|---|
| Example 1 | 72 | 1.70 | 0.95 | 1.02 | 0.0079 |
| Example 2 | 100 | 1.71 | 0.50 | 1.17 | 0.0020 |
| Example 3 | 50 | 1.71 | 0.87 | 1.02 | 0.0160 |
| Example 4 | 75 | 1.71 | 0.40 | 1.50 | 0.0037 |
| Comparative Example 1 | 25 | 1.68 | 1.05 | 0.97 | 0.0430 |
| Comparative Example 2 | 25 | 1.70 | 1.02 | 0.98 | 0.0300 |

Example 2

In the synthesis of the polymer of the Example 1, the polymer was synthesized by the same method as in the Example 1 except that 0.08 g of 2,2'-bis(trifluoromethyl)-4,4'-diaminobiphenyl was not added. The weight-average molecular weight of this polymer was 34,600 and the glass transition temperature thereof was 176.1° C.

It was confirmed by NMR that the obtained polymer was polyimide represented by the formula (2) (in which, m:n=100:0).

The obtained polymer was formed into a film in the same manner as in Example 1 (dry thickness: 8.15 μm). The birefringence index ($\Delta n_{xz}$) of this film at a wavelength of 550 nm was 0.002. The wavelength dispersion of this film was measured. The results are shown in FIG. 1.

Rth(450)/Rth(550) of Example 2 was 0.50 and Rth(650)/Rth(550) of Example 2 was 1.17.

Example 3

Synthesis of Diethynylfluorene 0.43 g of bis(benzonitrile)dichloropalladium (II) and 0.14 g of copper iodide (I) were dissolved in 19 mL of dioxane under nitrogen atmosphere. 4.70 g of tri(t-butylphosphine), 4.54 g of diisopropylamine, 4.59 g of phenylacetylene, and 10.0 g of 2,7-dibromo-9,9-bis(3-methyl-4-aminophenyl)fluorene were added thereto and stirred at room temperature for 24 hours. Thereafter, the solvent was removed under reduced pressure and the residual was purified by a silica gel packed column using a developing solvent (mixed solvent of hexane and ethyl acetate) to obtain 8.70 g of a compound. When measured by NMR, the obtained compound was 9,9-bis(3-methyl-4-aminophenyl)-2,7-bis(phenylethynyl)fluorene represented by the following formula (3).

[chemical formula 19]

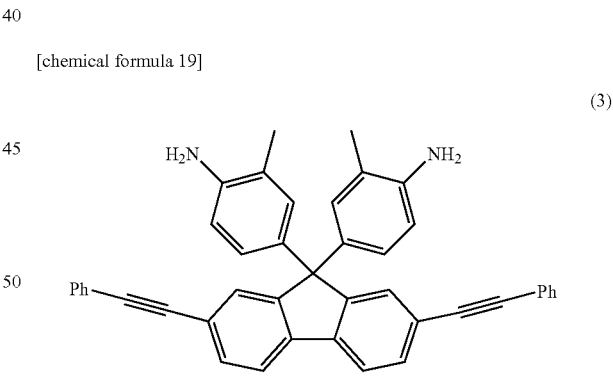

(3)

(Synthesis of Polymer)

1.59 g of 9,9-bis(3-methyl-4-aminophenyl)-2,7-bis(phenylethynyl)fluorene, 0.88 g of 2,2'-bis(trifluoromethyl)-4,4'-diaminobiphenyl, and 2.00 g of 1,1'-dichlorobiphenyl-3,3',4,4'-tetracarboxylic dianhydride were dissolved in 1.91 g of DMAC under nitrogen atmosphere and stirred at room temperature for 7 hours. Thereafter, 5.46 g of DMAC was added thereto, and 0.18 g of pyridine and 0.24 g of acetic anhydride were further added thereto and stirred for 16 hours.

The obtained reaction solution was dropped into isopropyl alcohol (IPA) to perform reprecipitation. The obtained polymer was filtered and washed with IPA twice to thereby obtain a polymer.

The weight-average molecular weight of this polymer was 15,300 and the glass transition temperature thereof was 179.0° C.

It was confirmed by NMR that the obtained polymer was polyimide represented by the following formula (4) (in which, m:n=50:50).

[chemical formula 20]

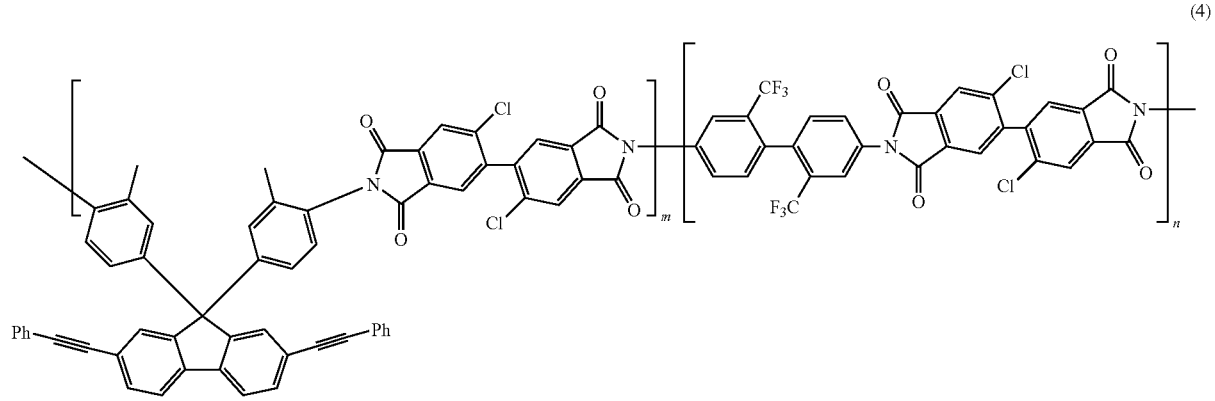

(4)

(Production of Film)

Figure 2:
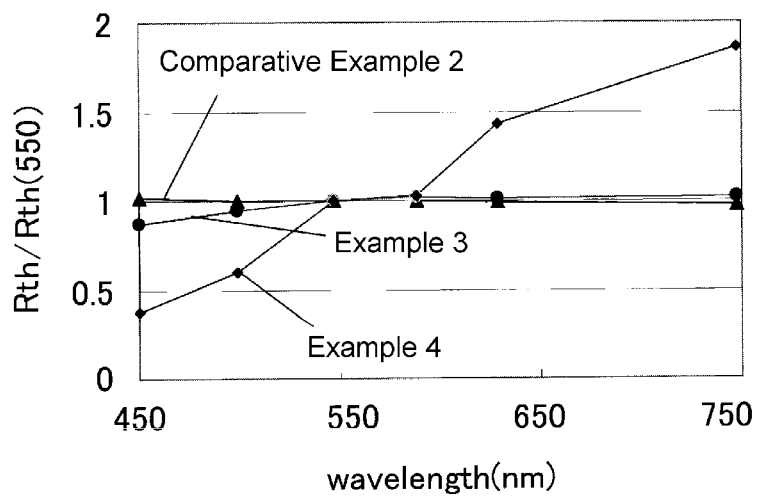
FIG. 2 is a graph showing wavelength dispersion of Examples 3 and 4 and Comparative Example 2.

The obtained polymer was formed into a film by the same method as in the Example 1 (dry thickness: 5.37 μm). The birefringence index ($\Delta n_{xz}$) of this film at a wavelength of 550 nm was 0.016. The wavelength dispersion of the retardation value in the thickness direction of this film was measured. The results are shown in FIG. 2.

Rth(450)/Rth(550) of Example 3 was 0.87 and Rth(650)/Rth(550) of Example 3 was 1.02.

Example 4

The polymer was synthesized by the same method as in the above Example 3 except that the additive amount of 9,9-bis(3-methyl-4-aminophenyl)-2,7-bis(phenylethynyl)fluorene, 2,2'-bis(trifluoromethyl)-4,4'-diaminobiphenyl, and 1,1'-dichlorobiphenyl-3,3',4,4'-tetracarboxylic dianhydride was changed to 1.19 g, 0.22 g, and 1.00 g, respectively. The weight-average molecular weight of this polymer was 14,400 and the glass transition temperature thereof was 164.3° C.

It was confirmed by NMR that the obtained polymer was polyimide represented by the formula (4) (in which, m:n=75:25).

The obtained polymer was formed into a film in the same manner as in Example 1 (dry thickness: 3.77 μm). The birefringence index ($\Delta n_{xz}$) of the obtained film at a wavelength of 550 nm was 0.0037. The wavelength dispersion of retardation value in the thickness direction of this film was measured. The results are shown in FIG. 2.

Rth(450)/Rth(550) of Example 4 was 0.40 and Rth(650)/Rth(550) of Example 4 was 1.50.

Comparative Example 1

The polymer was synthesized by the same method as in the above Example 1 except that the additive amount of 9,9-bis(3-methyl-4-aminophenyl)-2,7-bis(2-hydroxy-2-methyl-3-butynyl)fluor ene, 2,2'-bis(trifluoromethyl)-4,4'-diaminobiphenyl, and 1,1'-dichlorobiphenyl-3,3',4,4'-tetracarboxylic dianhydride was changed to 0.34 g, 0.60 g, and 0.90 g, respectively. The weight-average molecular weight of this polymer was 23,100 and the glass transition temperature thereof was 185.3° C.

It was confirmed by NMR that the obtained polymer was polyimide represented by the formula (2) (in which, m:n=25:75).

The obtained polymer was formed into a film by the same method as in Example 1 (dry thickness: 5.6 μm). The birefringence index ($\Delta n_{xz}$) of the obtained film at a wavelength of 550 nm was 0.043. The wavelength dispersion of retardation value in the thickness direction of this film was measured. The results are shown in FIG. 1.

Rth(450)/Rth(550) of Comparative Example 1 was 1.05 and Rth(650)/Rth(550) of Comparative Example 1 was 0.97.

Comparative Example 2

The polymer was synthesized by the same method as in the above Example 3 except that the additive amount of 9,9-bis(3-methyl-4-aminophenyl)-2,7-bis(phenylethynyl)fluorene, 2,2'-bis(trifluoromethyl)-4,4'-diaminobiphenyl, and 1,1'-dichlorobiphenyl-3,3',4,4'-tetracarboxylic dianhydride was changed to 0.79 g, 1.32 g, and 2.00 g, respectively.

The weight-average molecular weight of this polymer was 16,000 and the glass transition temperature thereof was 169.0° C.

It was confirmed by NMR that the obtained polymer was polyimide represented by the formula (4) (in which, m:n=25:75).

The obtained polymer was formed into a film by the same method as in Example 1 (dry thickness: 5.12 μm). The birefringence index ($\Delta n_{xz}$) of the obtained film at a wavelength of 550 nm was 0.030. The wavelength dispersion of this film was measured. The results are shown in FIG. 2.

Rth(450)/Rth(550) of Comparative Example 2 was 1.02 and Rth(650)/Rth(550) of Comparative Example 2 was 0.98.

What is claimed is:

1. An optical film comprising:
   a polyimide-based polymer represented by the following general formula (I'):

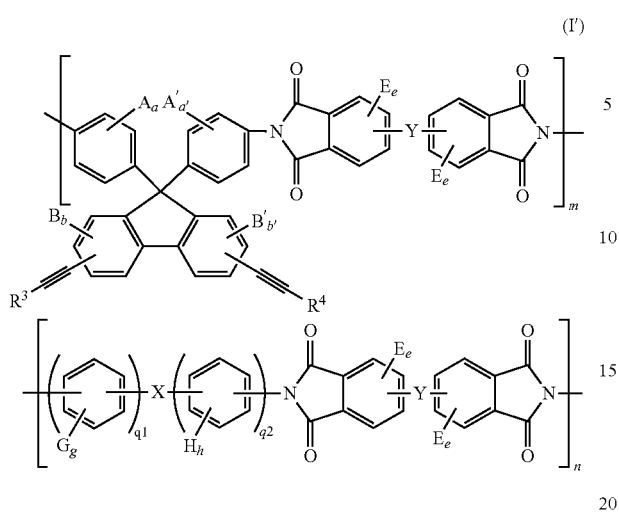

wherein m is 70% by mol or more and 100% by mol or less (m+n≤100% by mol); A, A', B and B' each denote a substituent, a and a' denote substitution number of the corresponding A and A' (an integer of 0 to 4), and b and b' denote substitution number of the corresponding B and B' (an integer of 0 to 3); A, A', B and B' each independently denote a halogen or an alkyl group having 1 to 4 carbon atoms, and are each identical or different in the case of being plural; $R^3$ and $R^4$ each independently denote an alkyl group having 1 to 10 carbon atoms or $CR^6R^7(OH)$ ($R^6$ and $R^7$ are each an alkyl group having 1 to 4 carbon atoms); X and Y each independently denote a covalent bond, or an atom or a group selected from the group consisting of a $CH_2$ group, a $C(CH_3)_2$ group, a $C(CZ_3)_2$ group (Z is a halogen), a CO group, an O atom, an S atom, an $SO_2$ group, an $Si(CH_2CH_3)_2$ group, and an $N(CH_3)$ group; E is a substituent and e denotes substitution number thereof (an integer of 0 to 3); E denotes an atom or a group selected from the group consisting of a halogen, an alkyl group having 1 to 3 carbon atoms, an alkyl halide group having 1 to 3 carbon atoms, a phenyl group, and a substituted phenyl group, and are each identical or different in the case of being plural; G and H are substituents, g denotes substitution number of G (an integer of 0 to 4), and h denotes substitution number of H (an integer of 0 to 4); G and H each independently denote an atom or a group selected from the group consisting of a halogen, an alkyl group, a substituted alkyl group, a nitro group, a cyano group, a thioalkyl group, an alkoxy group, an aryl group, a substituted aryl group, an alkyl ester group, and a substituted alkyl ester group, and are each identical or different in the case of being plural; and q1 denotes an integer of 0 to 3 and q2 denotes an integer of 1 to 3;

wherein an index ellipsoid satisfies a relationship of nx≈ny>nz, wherein nx denotes a refractive index in a direction for a maximum refractive index in a film plane (X-axis direction), ny denotes a refractive index in a direction orthogonal to the X-axis direction in the plane (Y-axis direction), and nz denotes a refractive index in the thickness direction; and wherein the optical film satisfies a relationship of Rth(450)/Rth(550)≤0.98, wherein Rth(450) and Rth(550) denote a retardation value in the thickness direction at a wavelength of 450 nm and a wavelength of 550 nm, respectively.

2. The optical film according to claim 1, wherein the optical film satisfies a relationship Rth(650)/Rth(550)≥1.02, and wherein Rth(550) and Rth(650) denote a retardation value in the thickness direction at a wavelength of 550 nm and a wavelength of 650 nm, respectively.

3. The optical film according to claim 1, wherein the optical film is composed of a coating film obtained by coating the polyimide-based polymer on a base material.

4. The optical film according to claim 1, wherein a thickness thereof is 20 μm or less.

5. An image display device comprising the optical film according to claim 1.

* * * * *